United States Patent [19]

Chapin

[11] 4,089,215

[45] May 16, 1978

[54] AIR FLOW TRANSDUCER

[75] Inventor: Leonard Lee Chapin, El Paso, Tex.

[73] Assignee: Autotronic Controls, Corp., El Paso, Tex.

[21] Appl. No.: 783,612

[22] Filed: Apr. 1, 1977

[51] Int. Cl.² .............................................. F02B 2/00
[52] U.S. Cl. ..................................... 73/116; 73/117.3; 123/32 EJ
[58] Field of Search .................. 73/116, 117.3, 119 A, 73/272 R; 123/32 EA, 32 EJ

[56] References Cited

U.S. PATENT DOCUMENTS 3,788,285  1/1974  Gelin et al. ....................... 123/32 EJ

*Primary Examiner*—Anthony V. Ciarlante
*Attorney, Agent, or Firm*—Fitch, Even, Tabin & Luedeka

[57] ABSTRACT

An air flow transducer for measuring rate of air flow into an engine having a propensity to backfire includes a rotor with vanes disposed to intercept the air flow. The vanes are formed of low density plastic and affixed to a rotor. The trailing edges of the vanes are shaped to direct forces occasioned by backfire pressure waves to hold the vanes to the hub.

7 Claims, 7 Drawing Figures

U.S. Patent May 16, 1978 Sheet 2 of 2 4,089,215
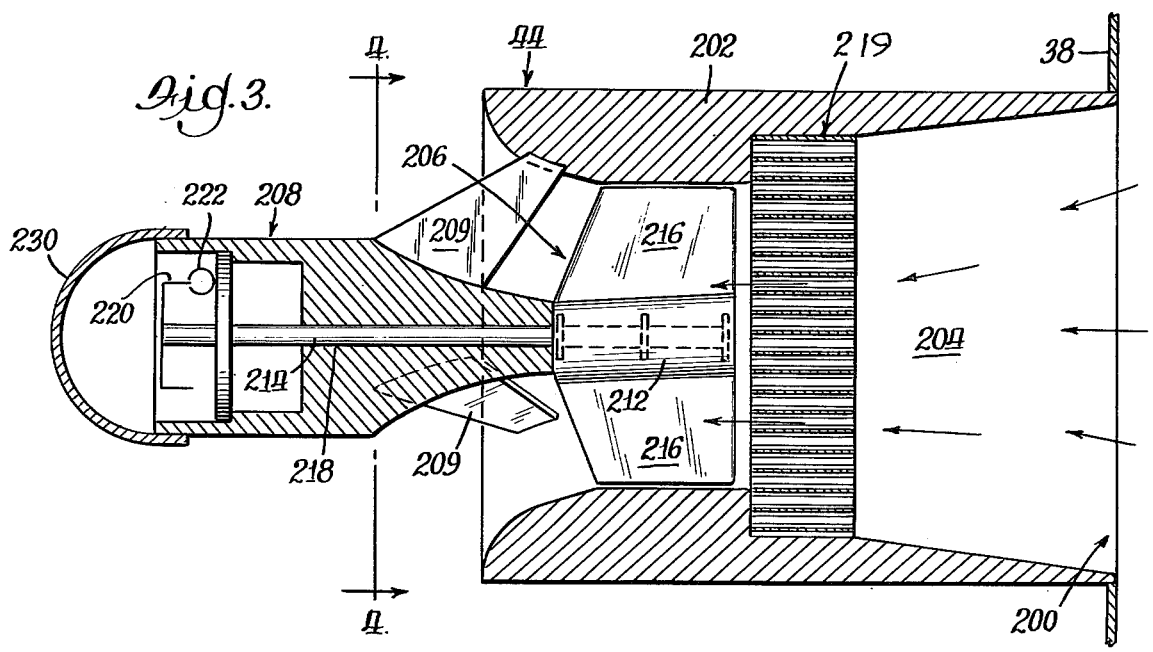
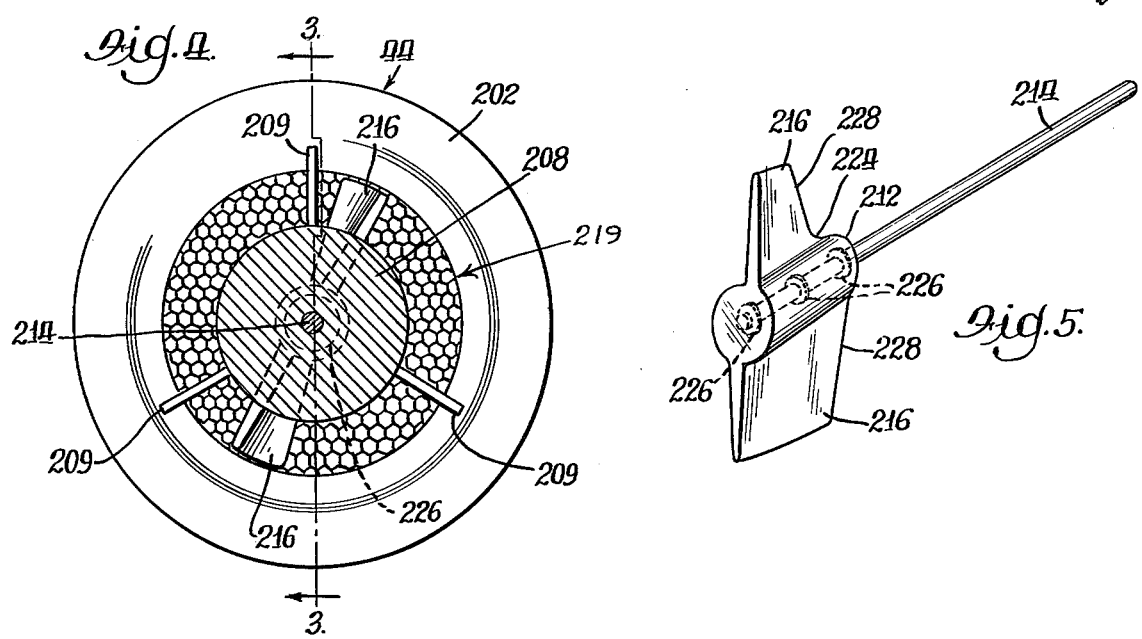
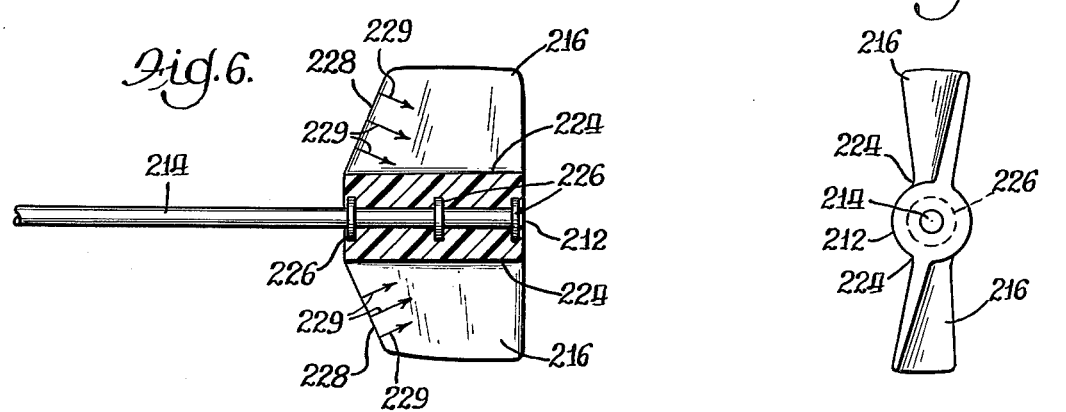

AIR FLOW TRANSDUCER

This invention relates generally to transducers for measuring air flow into the intake manifold of an internal combustion engine and more particularly to such transducers having rotatable vanes with reaction surfaces for directing forces resulting from backfire pressure waves.

It is well known to utilize fan or vane-type air flow transducers for measuring the rate of air flow into the intake manifold of an internal combustion engine, such as a piston driven gasoline engine, and to use the measurement in a fuel control system to provide fuel in a desired air/fuel ratio. Such as transducer in such a system is shown and described in Priegel U.S. Pat. No. 3,817,225, issued June 18, 1974. Such transducers are mounted in the stream of air flowing to the intake manifold. They include rotors having hub-mounted vanes for rotation by the air, the rate of rotation of the rotors being measured as an indication of rate of air flow. For fast response, it has been desired to make the inertia of the rotors small, and Priegel discloses the use of low density plastic for the rotor.

Efforts to reduce inertia by reducing the thickness of the vanes ultimately reached a limit where the vanes were broken off the hub in the course of operation. It was discovered that the vanes were being broken off by backfires inherent in the operation of piston engines. It was believed that the breaking was occasioned by a backfire pressure wave acting to try to reverse the direction of the rotor. That is, with normal air flow acting on the vanes to rotate the rotor in one direction, upon the occurrence of a backfire, the resulting backfire pressure wave acted on the vanes in the opposite direction, oppositely flexing the vanes and acting to reverse the direction of rotation of the rotor. It was believed that rotor failure was caused in the sudden reverse flexing, together with the inertia of the rotor and associated air, particularly after substantial fatigue of the material from prior backfires. It was therefore believed that the limit in reducing thickness was reached when the vanes began to fail too soon after being placed in service.

The applicant has discovered that the cause of failure was not what it seemed. Failure was not caused by the act of a backfire pressure wave to turn the rotor in an opposite direction, failure was resulting from the action of the backfire pressure wave on the trailing edges of the vanes, that is, at the edges downstream in normal air inflow. The forces developed on the trailing edges produced moments that tore the vanes radially away from the hub.

In accordance with the present invention the trailing edges of the vanes are cut back to slant from the hub toward the normal upstream direction. The angle is such that a backfire pressure wave urges the vanes toward the hub rather than tearing them off.

Thus, a primary object of the present invention is to provide an air flow transducer for measuring air flow into an engine that has a propensity to backfire. A further object is to provide vanes for such a transducer that are shaped to resist the effects of backfire pressure waves.

Other objects and advantages of the present invention will become apparent from the following detailed description, particularly when taken in conjunction with the accompanying drawings, in which:

FIG. 3 is an enlarged sectional view of the air flow transducer shown in FIG. 2, taken along line 3—3 in FIG. 4, with the rotor shown in elevation and the electromagnetic elements shown diagrammatically;

FIG. 4 is a sectional view of the air flow transducer of FIG. 3, taken along line 4—4 in FIG. 3, but with the rotor rotated from the position shown in FIG. 3;

FIG. 5 is a perspective view of the shaft-mounted hub and vanes of the rotor of the transducer shown in FIG. 3;

FIG. 6 is a side view, partly in section, of the shaft-mounted hub and vanes shown in FIG. 5; and FIG. 7 is an end view of the shaft-mounted hub and vanes shown in FIG. 5.

As stated above, the present invention is particularly useful in internal combustion engines having air-fuel control systems wherein fuel is supplied in controlled amounts providing a particular desired ratio of air to fuel for engine operation. In such systems, air flow to the intake manifold of the engine is controlled and measured, and air flow rate, usually in conjunction with other parameters, is used to develop a control signal used for providing fuel at the desired air/fuel ratio. Thus, the present invention may be utilized in fuel control systems such as that described in the aforesaid Priegel U.S. Pat. No. 3,817,225.

Figure 1:
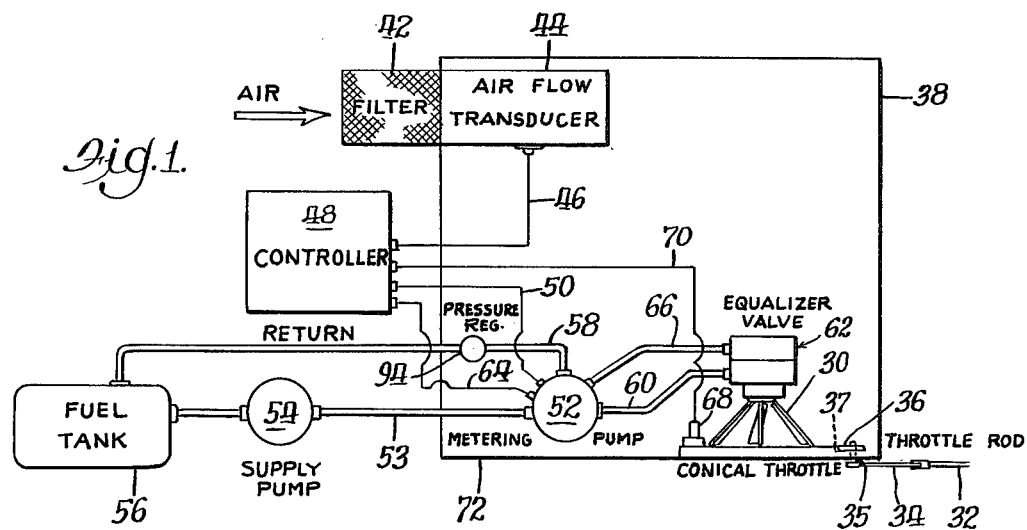
FIG. 1 is a diagrammatic illustration of a controlled air-fuel system for an internal combustion engine utilizing the air flow transducer of the present invention.

In FIG. 1 there is illustrated very generally an air and fuel control system like that shown by Priegel for supplying an appropriate mixture of air and fuel to the intake manifold of an internal combustion engine, which system has been modified, among other things, to utilize the air flow transducer of the present invention.

More particularly, the system of FIG. 1 includes a carburetor 30 which, as shown, is preferably conical. As a principal function of the carburetor 30 is to control the rate of flow of air to an intake manifold of an engine, the conical carburetor 30 is sometimes referred to as a conical throttle. The opening of the throttle is controlled by a throttle rod 32 which may be connected, for example, to a conventional automobile accelerator pedal. The throttle rod 32 may be connected through a crank 34, a shaft 35 and gears 36 and 37 to control the throttle opening and hence the rate of flow of air into the intake manifold. The conical throttle is enclosed in a housing 38 which fits over the intake manifold 40 of an internal combustion engine, as better seen in FIG. 2, with the interior of the housing 38 being open to the intake manifold 40 through the carburetor 30. The throttle control linkage passes through the housing 38 at the shaft 35.

All air flowing into the intake manifold flows through the housing 38, flowing into the housing through a filter 42 and an air flow transducer 44, shown in detail in FIGS. 3 to 7. The air flow transducer 44 measures the rate of air flow into, and hence out of, the housing 38 by producing a systematically related electrical signal on a conductor 46 which goes to an appropriate controller 48. The controller 48 may receive other signals from other sensors, such as temperature and pressure sensors, and may operate generally like the controller described in Priegel U.S. Pat. No. 3,817,225, utilizing the various signals to provide an appropriate fuel control signal on a conductor 50 to a metering pump 52.

The metering pump 52 is supplied with fuel through a conduit 53 by a supply pump 54 from a fuel tank 56 with any excess fuel being returned to the fuel tank 56 through a return conduit 58. The metering pump 52 supplies fuel to the carburetor 30 through a conduit 60 and an equalizer valve 62. A feedback signal indicative of pump speed is applied over a conductor 64 to the controller 48, which utilizes the feedback signal to assure that the metering pump 52 operate at the desired speed. Reference pressure is applied to the equalizer valve 62 through a conduit 66.

Also illustrated generally in FIG. 1 is a bypass throttle 68 which operates as an auxiliary air control for admitting a controlled additional amount of air into the intake manifold 40, as may be called for by a signal developed in the controller 48 and applied to the bypass throttle over a conductor 70.

It should be noted that each of the conductors 46, 50, 64 and 70, shown as a single line in FIG. 1, may comprise a pair of conductors to provide a return path for completion of the respective signal circuit.

Figure 2:
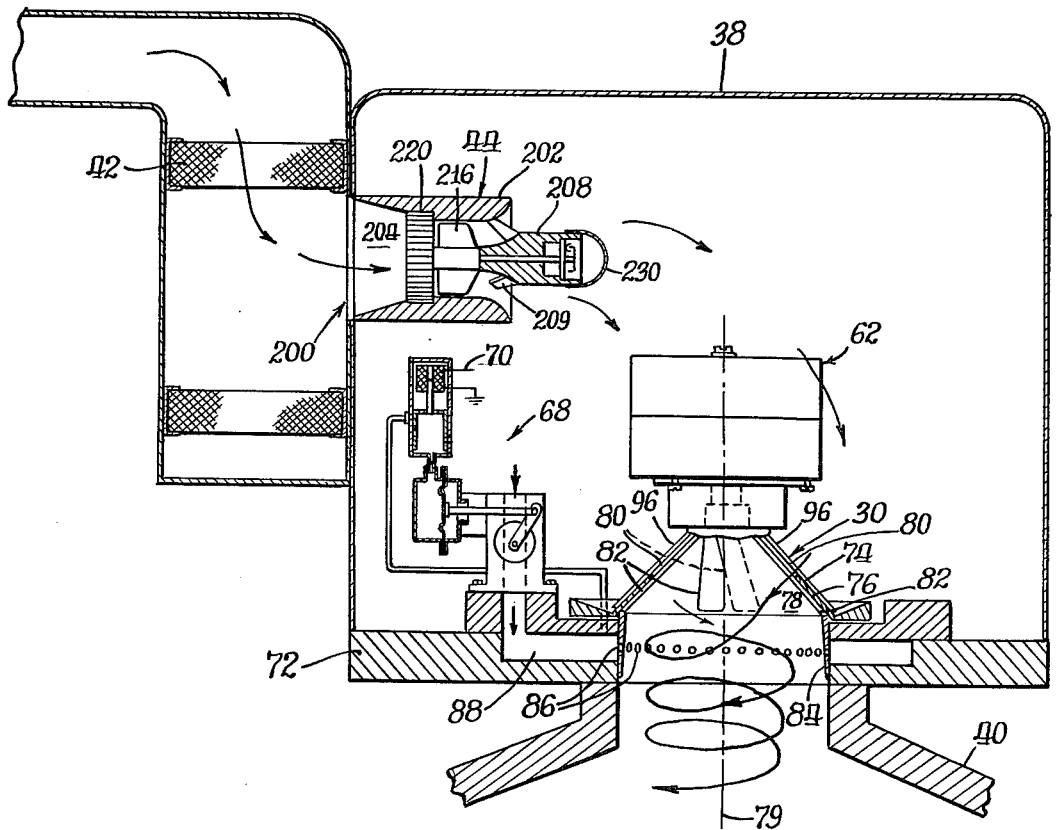
FIG. 2 is a vertical sectional view of the air flow system shown generally in FIG. 1.

As shown more particularly in FIG. 2, the housing 38 includes a base 72 which is mounted on the intake manifold 40 and on which the carburetor 30 is mounted, with the outlet of the carburetor 30 directly over the inlet to the intake manifold 40. The carburetor 30 is formed of a pair of valve members 74 and 76. The valve members 74 and 76 are preferably in the form of conical shells, as illustrated, and hence may be referred to as the outer cone 74 and inner cone 76, respectively. Both cones are hollow, the inner surface of the inner cone 76 forming a mixing chamber 78 wherein fuel and air are mixed.

The inner cone 76 is rigidly fastened to the base 72; whereas the outer cone 74 is rotatably mounted above the inner cone 76 with the inner cone nesting in the outer cone. That is, the outer surface of the inner cone and the inner surface of the outer cone are formed as surfaces of revolution about an axis 79 which, in the case of the carburetor illustrated, is a vertical axis down the centers of the cones. The outer cone 74 may thus be rotated about this axis relative to the inner cone 76 by operation of the throttle rod 32. To facilitate relative rotation, the outer cone may be mounted on bearing surfaces, keeping the mating surfaces slightly spaced from one another, reducing likelihood of binding. The inner cone is made fixed because it is fully exposed to the manifold vacuum, and the outer cone is relatively gently held against the inner cone by the relative pressures on the two sides of the outer cone. Were the outer cone fixed, the inner cone would be pulled away therefrom by the manifold vacuum, requiring additional means, such as a spring, to hold them together to limit air leakage between the cones.

The outer cone 74 includes a plurality of first openings 80 which are substantially identical to one another and are equally spaced around the axis of the cone 74. The inner cone 76 has a plurality of second openings 82 corresponding to the first openings in the outer cone whereby, when the cones are rotated relative to one another, the amount of overlap of the respective openings changes.

The inner cone 76 terminates in a skirt section 84 perforated by holes 86 that furnish passages for air between a channel 88 in the base 72 and the interior of the inner cone 76. The holes 86 and the channel 88 provide passages for air flowing through the bypass throttle 68.

The disclosed fuel feed system supplies fuel at a metered rate from the reservoir or fuel tank 56 to the overlapping first and second openings 80 and 82 of the carburetor 30. Fuel is pumped from the fuel tank 56 by the supply pump 54 and thence through the conduit 53 to the inlet to the metering pump 52 where it may pass through a filter. The fuel pumped by the supply pump 54 to the metering pump 52 that is in excess of the demand of pump 52 passes on to the return conduit 58, whence the excess fuel returns to the fuel tank 56 through a pressure regulator valve 94. The pressure regulator valve 94 regulates the fuel pressure at the inlet side of the metering pump 52, maintaining such pressure sufficiently high as substantially to preclude the formation of bubbles in the fuel. Pressures in excess of 30 psi have proven satisfactory, for example about 40 psi. Bubbles are undesirable, as they displace liquid and hence would make the metering pump non-linear. The inlet pressure is applied through the conduit 66 to one side of the equalizer valve 62. The metering pump 52, which may be a gear pump, supplies fuel at a metered rate, as will be described below, through the conduit 60 to the other side of the equalizer valve 62 and thence through rails 96 and the overlap of the openings 80 and 82 into the mixing chamber 78 in the interior of the conical throttle 30.

The rate at which the metering pump operates is determined by the speed of a metering pump motor which drives the metering pump 52 itself. The speed of the motor is controlled by the power supplied to the motor from the controller 48 over the conductor 50. The speed at which the motor and, hence, the metering pump 52 operate is measured by a tachometer which produces a signal on the conductor 64 which indicates pump speed.

The metering pump 52, particularly when used with the equalizer valve 62, operates to pump liquid at a rate proportional to the speed of the pump; hence the signal indicative of motor and pump speed is a measure of rate of fuel flow. This signal is applied as a feedback signal to the controller 48. The controller 48 may operate as the controller disclosed in the aforesaid Priegel U.S. Pat. No. 3,817,225 to compare a signal dependent upon air flow with the feedback signal to produce a driving signal to the pump motor over the conductor 50 for driving the metering pump 52 to supply fuel to the rails 96 at the appropriate air/fuel ratio for which the controller 48 is programmed.

A preferred form of air flow transducer 44 in accordance with the present invention is illustrated in greater detail in FIGS. 3 to 7. FIG. 3 is an enlarged cross sectional view of the air flow transducer 44 shown generally in FIG. 2, the section being taken in the opposite direction, and the rotor of the transducer being shown in elevation. The air flow transducer 44 is rigidly fastened to the housing 38 by any convenient means, such as bolts, to fill an inlet opening 200 in the housing. The transducer 44 includes a flow tube 202 forming a cylindrical passageway 204 extending therethrough, through which flows the air flowing into the housing 38. It is the rate of flow of this air that is measured by the transducer 44.

The transducer 44 comprises a rotor 206 and a stator 208. The stator 208 is rigidly mounted as by fins 209 to the flow tube 202 centrally of the passageway 204. The stator 208 is displaced axially along the passageway 204 so as to be mostly beyond the passageway 204 and not impede air flow through the passageway 204 excessively. The stator 208 also has a somewhat streamlined front end (the end facing the incoming air) for the same purpose. The stator 208 acts to support the rotor 206 for rotation within the passageway 204.

The rotor 206 includes a hub 212 supported on a shaft 214 and itself supporting vanes 216 symmetrically disposed on the hub 212. The shaft 214 is rotatably mounted in a bearing 218 on the stator 208. The shaft 214 may be held in the bearing 218 by any convenient means, as by a snap ring snapped into a groove in the shaft 214. The rotor 206 is mounted so that the vanes 216 extend substantially across the passageway 204 and are free to turn with the hub 212 and the shaft 214. The vanes 216 are twisted so that the vanes 216 intercept the air flow through the passageway 204 and are moved by this air. Movement of the vanes 216 causes the hub 212 and the shaft 214 to rotate at a speed determined by the rate of flow of air through the passageway 204. To assure accuracy of measurement the air flow is straightened by a flow straightener 219, which may be a honeycomb array, fastened in the passageway 204 just upstream of the vanes 216.

As the speed of rotation of the shaft 212 is a measure of rate of air flow, a signal indicative of such speed of rotation may be developed by any convenient signal means. In the preferred embodiment illustrated such signal means may comprise a member 220 affixed to the shaft 214 for rotation with the rotor 20 and a pick-up coil 222 fastened to the stator 208. The coil 222 may be part of a detection circuit that develops a characteristic signal as the rotor member 220 rotates relative to the coil 222, such signal being systematically related to the rate of rotation of the rotor and hence to rate of air flow into the engine. The member 220 may be a segmented metallic member rotating in the magnetic field of the coil 222, cyclically changing the load in the detection circuit as the rotor turns. Depending upon the nature of the signal developed by the detection circuit and the relative signal levels and noise levels in the circuitry, the signal may be applied directly to the conductor 46 for transmission to the controller 48, or the signal may first be operated upon by electronic circuitry mounted on the stator 208 to provide a corresponding signal better suited for such transmission. In the controller 48, the transmitted signal is utilized as a measure of rate of air inflow to develop suitable fuel pump motor control signals for providing fuel at the desired air/fuel ratio.

As mentioned above, the inertia of the rotor 206 is made relatively low to provide prompt and accurate response to changes in rate of air flow. This is achieved by making the vanes 216 of low density plastic. A plastic material found particularly suitable has been a foamed polyurethane material, preferably reinforced with glass fibers and/or carbon fibers. To reduce inertia, the vanes are tapered toward their outward extremities. This reduces mass at the parts most distant from the axis of rotation, markedly reducing the moment of inertia of the rotor. At the same time, this tapering does not impair the structural integrity of the rotor as the moment arms for sections remote from the axis are much less than for those near the axis. Forces on the vanes at points outward of the more remote sections can therefore not develop such destructive bending moments. The vanes 216 are their thickest at their roots 224 where they join the hub 212.

Preferably, the vanes 216 are made integrally with the hub 212 by molding them integrally therewith about the shaft 214. This not only provides a secure bonding of the vanes 216 to the hub 212 at the vane roots 224, but the hub 212 is made of the same low density plastic as the vanes 216, thus further reducing the rotor inertia. To assure adequate bonding of the hub 212 to the shaft 214, the shaft 214 may be roughened at the hub end, and a plurality of retaining members 226 may be fastened to the shaft 214. These retaining members may be like snap rings and may be frictionally held to the shaft 214 by self generated spring forces within the rings. That is, the rings are spread in being mounted on the shaft 214, and their own spring restoring forces act to grip the shaft 214. When the plastic hub and vanes are molded to the shaft 214, the hub material flows around the retaining members 226, which thereafter hold the hub 212 to the shaft 214.

As mentioned above, air transducers of the prior art often failed at the trailing edges where the vanes joined the hub. Applicant has discovered that the mode of failure was lifting of the vanes radially from the hub by moments created by the pressure of backfire pressure waves on the trailing edge. In accordance with the present invention as seen particularly in FIG. 6, the trailing edges 228 of the respective vanes 216 are made to slope at a substantial angle from the hub 212 toward the upstream end of the air flow transducer 44, that is, upstream in respect to normal air flow. The trailing edges 228 present reaction surfaces which react to forces produced by any backfire pressure wave. As pressure forces are transmitted normally of a surface, as indicated by arrows 229 in FIG. 6, the slope of the trailing edge assures that the forces applied by backfire pressure waves act to force the trailing edges 228 toward the hub 212, particularly at the roots 224 where failure had occurred in air flow transducers of the prior art. A particular shape for the trailing edges may be developed empirically to suit the backfire pressure wave developed by a particular engine. A trailing edge sloping more away from the plane normal to the axis is more secure against backfire, but results in less vane area for responding to the normal air flow. The slope is thus made adequate to secure the vane against backfire while at the same time achieving suitable area for responding to normal air flow.

A further protection against backfire is to provide paths for the backfire pressure waves as will reduce the shock at the vanes 216. One means for achieving this is by an enlarged section at the downstream end of the stator 208 which provides an end surface 230 shaped to deflect and hence diffuse the backfire pressure waves.

While a preferred embodiment of the present invention has been disclosed for particular conditions, various modifications can be made within the scope of the present invention, particularly as may be made necessary or desirable to suit other engines and other operating conditions.

What is claimed is:

1. An air flow transducer for measuring the rate of air flow into the intake manifold of an internal combustion engine having a propensity to backfire on occasion, said transducer comprising a flow tube forming a passageway, means for mounting said flow tube to pass the air flowing to said intake manifold through said passageway, a rotor having a shaft with a hub mounted thereon for rotation therewith and a plurality of vanes extending outwardly from said hub, means for mounting said shaft for rotation of said rotor within said passageway, and signal means for providing an electrical signal systematically related to the rate of rotation of said rotor, said vanes being equally spaced around the periphery of said hub and shaped to intercept air flowing through said passageway for movement by said air, said vanes being formed of low density plastic, each of said vanes having a thickened root at which it joins said hub, and each of said vanes having a trailing edge that slopes from said hub in the upstream direction at a substantial angle to the plane normal to said shaft to provide a reaction surface to any backfire pressure wave that forces said trailing edge in the direction of said hub in counteraction to forces created by said backfire pressure wave directed to tearing said vane from said hub.

2. A transducer according to claim 1 wherein said vanes are formed integrally with said hub.

3. A transducer according to claim 2 wherein said low density plastic is fiber reinforced foamed plastic.

4. A transducer according to claim 3 wherein said low density plastic is foamed polyurethane reinforced by glass and/or carbon fibers.

5. A transducer according to claim 2 wherein said vanes number two disposed at respective diametrically opposite locations on said hub.

6. A transducer according to claim 1 including means for deflecting and diffusing at least a portion of said backfire pressure wave from direct impingement on said vanes.

7. A transducer according to claim 1 wherein said means for mounting said shaft comprises an enlarged section at the manifold end of said shaft for deflecting and diffusing at least part of said backfire pressure waves from direct impingement on said vanes.

* * * * *